UNITED STATES PATENT OFFICE.

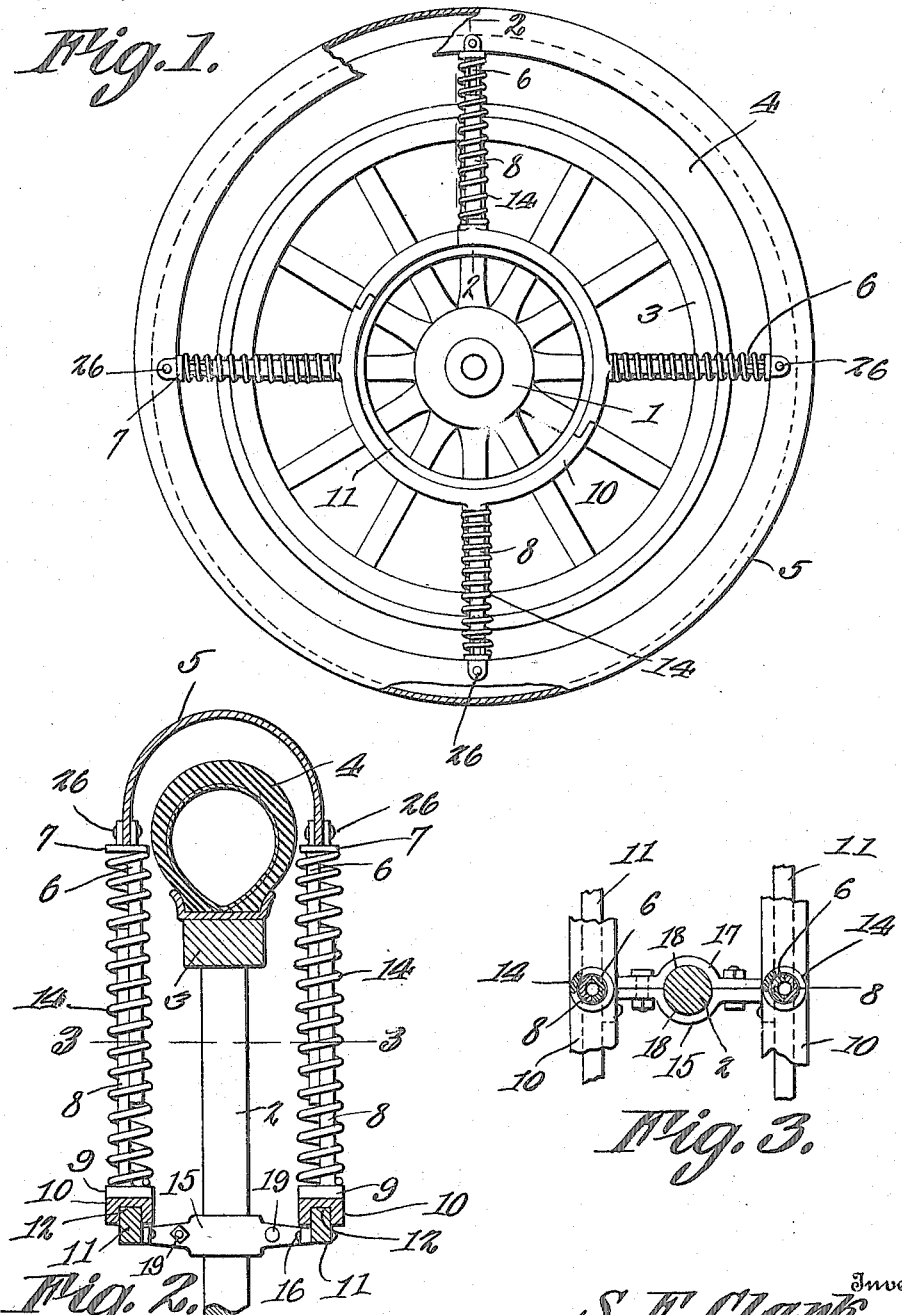

SEALY EPHRAIM CLARK, OF GAGE, OKLAHOMA.

TIRE-PROTECTOR.

1,271,019.     Specification of Letters Patent.    Patented July 2, 1918.

Application filed June 14, 1917. Serial No. 174,736.

*To all whom it may concern:*

Be it known that I, SEALY EPHRAIM CLARK, a citizen of the United States, residing at Gage, in the county of Ellis and State of Oklahoma, have invented a new and useful Tire-Protector, of which the following is a specification.

The device forming the subject matter of this application is of that general type in which a vehicle wheel is mounted to roll within an annular trough-shaped tread which is of greater diameter than the wheel, and the present invention aims to provide novel means for supporting and sustaining the tread yieldingly.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in side elevation, a vehicle wheel equipped with the device forming the subject matter of this application;

Fig. 2 is cross section on the line 2—2 of Fig. 1;

Fig. 3 is a section taken approximately on the line 3—3 of Fig. 2.

The numeral 1 denotes the hub of a wheel from which radiate spokes 2 connected with a rim 3 carrying a tire 4 of any desired sort.

In carrying out the present invention there is provided annular, trough-shaped tread 5, of greater diameter than the wheel of which the tire 4 constitutes a part, the wheel being mounted to roll in the tread. Radially disposed inwardly projecting fingers 6, which are trough-shaped in cross section, are secured as shown at 26 in the opposite sides of the tread 5. At their outer ends, the fingers are supplied with abutments 7 engaging the inner edges of the tread 5. Disposed opposite to the fingers 6 are fingers 8 which also are trough-shaped in cross section, the fingers 8 being supplied adjacent their inner ends with abutments 9 bearing on a ring 10 to which the fingers 8 are secured. The ring 10 is of sectional construction and rotates on a fixed track 11, the ring being grooved as indicated at 12 to receive the track. Helical compression springs 14 surround the fingers 8 and 6 and engage the abutments 7 and 9.

The fixed tracks 11 at the opposite sides of the wheel are attached to the spokes of the wheel by clamps each including a cross bar 15 secured detachably as shown at 16 to the tracks 11. A removable jaw 17 coöperates with each cross bar 15, the jaws 17 and the cross bars 15 being provided with complemental recesses 18 receiving the spokes 2. Securing elements 19 unite the jaws 17 detachably with the cross bars 15.

In practical operation, the tire 4 rolls within the trough-shaped metal tread 5 and is protected thereby. Since the tread 5 is of greater diameter than the tire 4, there is a circumferential creeping action between the tread and the tire. This creeping action can take place, because the ring can rotate on the track 11. The fingers 8 and 6 and the springs 14 support the tread 5 yieldingly and avoid an undue lateral movement of the tread.

Having thus described the invention, what is claimed is:—

In a device of the class described, a wheel; a tread of greater diameter than the wheel and spaced therefrom, and in which the wheel rolls; a fixed annular track on the wheel; a ring mounted to rotate on the track; coöperating fingers carried by the tread and by the ring and provided with abutments; and compression springs surrounding the fingers and engaged terminally with the abutments.

In testimony that I claim the foregoing as my own, I have hereto affixed my signature in the presence of two witnesses.

SEALY EPHRAIM CLARK.

Witnesses:
  C. E. DANIELS,
  M. MCMANNIS.